United States Patent Office 3,457,179
Patented July 22, 1969

3,457,179
URANIUM ACTIVATED FLUORESCENT MATERIALS
Samuel Natansohn, Massapequa Park, N.Y., assignor to General Telephone & Electronics Laboratories Incorporated, a corporation of Delaware
No Drawing. Filed Dec. 6, 1967, Ser. No. 688,312
Int. Cl. C09k 1/62, 1/04
U.S. Cl. 252—301.1                    9 Claims

ABSTRACT OF THE DISCLOSURE

Uranium activated phosphor compounds having a host consisting of lithium and magnesium oxides combined with oxides of selected tetravalent, hexavalent and pentavalent metal ions. These phosphors emit radiation in the green region of the visible spectrum upon excitation with ultraviolet, cathode-ray or X-ray radiation. They may be used as phosphors in high pressure mercury lamps and other fluorescent discharge devices and in cathode ray tube screens.

BACKGROUND OF THE INVENTION

This invention relates to fluorescent materials which emit a green luminescence when exposed to ultraviolet, cathode ray or X-ray radiation and, in particular, to uranium activated phosphors wherein the host component comprises lithium and magnesium oxide compounds combined with tetravalent, pentavalent and/or hexavalent metal oxide compounds.

U.S. Patent 2,785,137 discloses luminescent materials comprising a matrix of the elements magnesium, lithium, antimony and oxygen, the matrix being activated by manganese or uranium or both. These materials are prepared by mixing oxide compounds of magnesium, lithium and antimony with compounds of manganese and/or uranium, and then firing the mixture at a temperature in the range 700° C. to 1250° C. When activated with manganese the material emits a deep red luminescence under excitation by ultraviolet light. When activated with uranium and excited under the same conditions, the phosphor emits a green luminescence.

SUMMARY OF THE INVENTION

The present invention comprises a phosphor consisting essentially of compositions defined by the formula $(Li_2O)_x(MgO)_y(AO_2)_z(BO_3)_z(C_2O_5)_{1-z}$: $wU$ where A is a tetravalent metal ion selected from the group consisting of Ti, Zr, Hf, Ge, Sn and Pb; B is a hexavalent metal ion selected from the group consisting of Mo, Te and W; C is a pentavalent metal ion selected from the group consisting of Nb, Sb and Ta; $x$ is between 2 and 6; $x+y=8$; $z$ is greater than zero and does not exceed 1; and $w$ has a value selected to produce fluorescence when the composition is excited by ultraviolet, cathode-ray or X-ray radiation. More specifically, $w$ has a value in the range 0.005 to 0.10 gram-atom per gram-atom of the host $(Li_2O)_x(MgO)_y(AO_2)_z(BO_3)_z(C_2O_5)_{1-z}$, with maximum luminescence being obtained for a value of $w$ of about 0.02.

The invention also includes phosphor compositions in which $z=0$ and C is selected from the group consisting of Nb and Ta.

It is believed that the actual luminescence centers in the described compositions consist of uranium ions coordinated by several oxygen ions in the host matrix. The luminescence from these uranium-oxygen centers is similar to that attributed to electronic transitions within the molecular uranyl ion, $UO_2\cdot^{2+}$. Thus, while the subject phosphors are believed best defined as uranium activated, they may also be considered as uranyl activated.

The subject phosphor compounds are preferably prepared by mixing the appropriate amounts of lithium carbonate and the appropriate oxides of the aforementioned metals of Groups IV, V, and/or VI of the Periodic Table. Alternately, compounds which yield the desired oxides upon thermal decomposition may be substituted for the lithium and magnesium carbonates and the oxides of the Groups IV, V and VI elements. The uranium activator is added in the form of a uranyl salt such as a nitrate or acetate.

In the synthesis of compounds containing antimony, the trioxide of antimony $Sb_2O_3$, in which the antimony is in the 3+ is used and during the fixing process the antimony is oxidized to the 5+ state. In the preparation of compounds containing niobium or tantalum the pentoxides $Nb_2O_5$ and $Ta_2O_5$ respectively are used.

The mixture of the component materials is heated in air in a series of steps at elevated temperatures, the sample being ground in a mortar between the firing steps. The optimum firing temperature depends on the thermal stability of the compound and, for most of the disclosed compounds, is in the range 1200° to 1400° C.

All of the subject compounds emit green light having an emission peak between 520 and 525 nanometers with a half-line width of 35 to 40 nanometers when excited by ultraviolet or cathode ray radiation.

DESCRIPTION OF THE PREFERRED EMBODIMENTS

Example I 6.65 grams of lithium carbonate $Li_2CO_3$, 13.95 grams of basic magnesium carbonate, 7.97 grams of niobium pentoxide $Nb_2O_5$ and 0.1273 gram of uranyl acetate $UO_2(C_2H_3O_2)_2 \cdot 2H_2O$ were mixed thoroughly and fired sequentially in alumina crucibles at 800° C., 1100° C., 1200° C. and 1300° C. Each firing was carried out for a period of about 4 hours, the sample being cooled and ground between firing steps. The resulting phosphor $Li_6Mg_5Nb_2O_{13}$: 0.01 U emits green light when excited by ultraviolet or cathode-ray radiation, the emission peak being at 525 nanometers with a half width of 35 nanometers.

Example II 8.87 grams of lithium carbonate, 11.01 grams of basic magnesium carbonate, 13.25 grams of tantalum pentoxide $Ta_2O_5$ and 0.1273 gram of uranyl acetate were mixed thoroughly and fired in alumina crucibles at 800° C., 1100° C. and 1300° C. Each firing was carried out for a period of about 4 hours, the samples being cooled and ground between firing steps. The resulting phosphor $Li_8Mg_4Ta_2O_{13}$: 0.01U emits green light with an emission peak at 520 nanometers and a half width of 40 nanometers when excited by ultraviolet or cathode-ray radiation.

Example III 6.65 grams of lithium carbonate, 13.77 grams of basic magnesium carbonate, 4.38 grams of antimony trioxide $Sb_2O_3$, 1.57 grams of germanium dioxide $GeO_2$, 3.48 grams of tungsten trioxide $WO_3$, and 0.2545 gram of uranyl acetate were mixed thoroughly and then fired in alumina crucibles at 800° C., 1000° C., 1100° C., 1200° C. and 1300° C. The firing times were approximately the same as in Examples I and II, and the material was ground between firings. The resulting phosphor

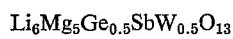

$Li_6Mg_5Ge_{0.5}SbW_{0.5}O_{13}$ 0.02$UO_2$ emits green light with an emission peak at 520 nanometers and a half-line width of 35 nanometers when excited by ultraviolet and cathode-ray radiation.

Example IV 6.65 grams of lithium carbonate, 13.77 grams of basic magnesium carbonate, 4.38 grams of antimony trioxide, emission peak in the 520–525 nanometer range and half line widths of 35–40 nanometers. The mixtures used to produce these phosphors and the optimum maximum firing temperature are given in Tables I and II.

TABLE I

| Composition $Li_{2x}Mg_yA_zB_zC_{2(1-z)}:wU$ | Lithium carbonate (grams) | Basic magnesium carbonate (grams)[1] | Uranyl acetate (gram) | Oxide of A (grams) | Oxide of B (grams) | Oxide of C (grams) | Optimum firing temp. (° C.) |
|---|---|---|---|---|---|---|---|
| $Li_6Mg_5Hf_{0.5}Te_{0.5}SbO_{13}$: 0.02U | 6.65 | 13.77 | 0.2545 | HfO$_2$: 3.15 | Te(OH)$_6$: 3.44 | Sb$_2$O$_3$: 4.38 | 1,400 |
| $Li_6Mg_5Ge_{0.5}Te_{0.5}SbO_{13}$: 0.02U | 6.65 | 13.77 | 0.2545 | GeO$_2$: 1.57 | Te(OH)$_6$: 3.44 | Sb$_2$O$_3$: 4.38 | 1,300 |
| $Li_6Mg_5Ti_{0.5}Te_{0.5}SbO_{13}$: 0.02U | 6.65 | 13.77 | 0.2545 | TiO$_2$: 1.20 | Te(OH)$_6$: 3.44 | Sb$_2$O$_3$: 4.38 | 1,300 |
| $Li_6Mg_5Pb_{0.5}Te_{0.5}SbO_{13}$: 0.02U | 6.65 | 13.77 | 0.2545 | PbO$_2$: 3.59 | Te(OH)$_6$: 3.44 | Sb$_2$O$_3$: 4.38 | 1,100 |
| $Li_6Mg_5Zr_{0.5}Te_{0.5}SbO_{13}$: 0.02U | 6.65 | 14.17 | 0.2545 | ZrO$_2$: 1.85 | Te(OH)$_6$: 3.44 | Sb$_2$O$_3$: 4.38 | 1,300 |
| $Li_6Mg_5Sn_{0.5}W_{0.5}SbO_{13}$: 0.02U | 6.65 | 13.77 | 0.2545 | SnO$_2$: 2.26 | WO$_3$: 3.48 | Sb$_2$O$_3$: 4.38 | 1,400 |
| $Li_6Mg_5Hf_{0.5}W_{0.5}SbO_{13}$: 0.02U | 6.65 | 13.77 | 0.2545 | HfO$_2$: 3.15 | WO$_3$: 3.48 | Sb$_2$O$_3$: 4.38 | 1,400 |
| $Li_6Mg_5Ti_{0.5}W_{0.5}SbO_{13}$: 0.02U | 6.65 | 13.77 | 0.2545 | TiO$_2$: 1.20 | WO$_3$: 3.48 | Sb$_2$O$_3$: 4.38 | 1,300 |
| $Li_6Mg_5Pb_{0.5}W_{0.5}SbO_{13}$: 0.02U | 6.65 | 13.77 | 0.2545 | PbO$_2$: 3.59 | WO$_3$: 3.48 | Sb$_2$O$_3$: 4.38 | 1,100 |
| $Li_6Mg_5Zr_{0.5}W_{0.5}SbO_{13}$: 0.02U | 6.65 | 14.17 | 0.2545 | ZrO$_2$: 1.85 | WO$_3$: 3.48 | Sb$_2$O$_3$: 4.38 | 1,400 |

[1] The variations in the amounts of basic magnesium carbonate used reflect changes in the magnesium content in different lots of this nonstoichiometric material.

TABLE II

| Composition $Li_{2x}Mg_yA_zB_zC_{2(1-z)}:wU$ | Lithium carbonate (grams) | Basic magnesium carbonate (grams)[1] | Uranyl acetate (gram) | Oxide of A (grams) | Oxide of B (grams) | Oxide of C (grams) | Optimum firing temp. (° C.) |
|---|---|---|---|---|---|---|---|
| $Li_6Mg_5SnTeO_{13}$: 0.02U | 6.65 | 13.77 | 0.2545 | SnO$_2$: 4.52 | Te(OH)$_6$: 6.88 | | 1,200 |
| $Li_6Mg_5HfTeO_{13}$: 0.02U | 6.65 | 13.77 | 0.2545 | HfO$_2$: 6.30 | Te(OH)$_6$: 6.88 | | 1,300 |
| $Li_6Mg_5GeTeO_{13}$: 0.02U | 6.65 | 13.77 | 0.2545 | GeO$_2$: 3.14 | Te(OH)$_6$: 6.88 | | 1,300 |
| $Li_6Mg_5TiTeO_{13}$: 0.02U | 6.65 | 13.77 | 0.2545 | TiO$_2$: 2.40 | Te(OH)$_6$: 6.88 | | 1,300 |
| $Li_6Mg_5PbTeO_{13}$: 0.02U | 6.65 | 13.77 | 0.2545 | PbO$_2$: 7.18 | Te(OH)$_6$: 6.88 | | 1,000 |
| $Li_6Mg_5SnWO_{13}$: 0.02U | 6.65 | 13.77 | 0.2545 | SnO$_2$: 4.52 | WO$_3$: 6.96 | | 1,200 |
| $Li_6Mg_5GeWO_{13}$: 0.02U | 6.65 | 13.77 | 0.2545 | GeO$_2$: 3.14 | WO$_3$: 6.96 | | 1,200 |
| $Li_6Mg_5TiWO_{13}$: 0.02U | 6.65 | 13.77 | 0.2545 | TiO$_2$: 2.40 | WO$_3$: 6.96 | | 1,300 |
| $Li_6Mg_5PbWO_{13}$: 0.02U | 6.65 | 13.77 | 0.2545 | PbO$_2$: 7.18 | WO$_3$: 6.96 | | 1,100 |
| $Li_6Mg_5ZrWO_{13}$: 0.02U | 6.65 | 14.17 | 0.2545 | ZrO$_2$: 3.70 | WO$_3$: 6.96 | | 1,200 |
| $Li_8Mg_5Nb_2O_{13}$: 0.01U | 8.87 | 11.01 | 0.1273 | | | Nb$_2$O$_5$: 7.97 | 1,300 |
| $Li_6Mg_5Zr_{0.5}Mo_{0.5}NbO_{13}$: 0.01U | 6.65 | 13.77 | 0.1273 | ZrO$_2$: 1.85 | MoO$_3$: 2.16 | | 1,300 |
| $Li_6Mg_5Ta_2O_{13}$: 0.01U | 6.65 | 13.95 | 0.1273 | | | Ta$_2$O$_5$: 13.25 | 1,200 |
| $Li_6Mg_5Hf_{0.5}W_{0.5}TaO_{13}$: 0.01U | 6.65 | 13.77 | 0.1273 | HfO$_2$: 3.15 | WO$_3$: 3.48 | Ta$_2$O$_5$: 13.25 | 1,300 |

[1] See note to Table I.

2.26 grams of tin dioxide, SnO$_2$, 3.44 grams of orthotelluric acid Te(OH)$_6$, and 0.2545 gram of uranyl acetate were mixed thoroughly and fired in alumina crucibles at 800° C., 1000° C. and 1200° C. for a period of 4 hours each and at 1300° C. and 1400° C. for a period of approximately 1 hour each. The resulting phosphor $$Li_6Mg_5Sn_{0.5}SbTe_{0.5}O_{13}$$

0.02U emits green light with an emission peak at 520 nanometers and a half-line of 40 nanometers upon excitation by ultraviolet or cathode-ray radiation.

Example V 6.65 grams of lithium carbonate, 13.77 grams of basic magnesium carbonate, 6.30 grams of hafnium dioxide, HfO$_2$, 6.96 grams of tungsten trioxide, and 0.2545 gram of uranyl acetate were mixed and fired in alumina crucibles at 800° C., 1000° C., 1100° C. and 1200° C. As in the previous examples the phosphors were ground between firings and were fired for periods of approximately 4 hours. The resulting phosphor Li$_6$Mg$_5$HfWO$_{13}$: 0.02U emits green light peaking at 520 nanometers with a half-line width at 40 nanometers under ultraviolet or cathode-ray radiation.

Example VI 6.65 grams of lithium carbonate, 13.77 grams of basic magnesium carbonate, 3.70 grams of zirconium dioxide ZrO$_2$, 6.88 grams of orthotelluric acid and 0.2545 gram of uranyl acetate were mixed and then fired in alumina crucibles at 800° C., 1100° C. and 1200° C. for period of approximately 4 hours each. The resulting phosphor Li$_6$Mg$_5$ZrTeO$_{13}$: 0.02U emits green light with an emission peak of 522 nanometers and a half-line width of 35 nanometers when excited by ultraviolet or cathode-ray radiation.

Example VII

A number of other compositions were prepared by the same general method as described for Examples I to VI. All of these phosphors emitted green light with the same approximate spectral characteristics. When excited by ultraviolet or cathode-ray radiation they exhibited an Summarizing, uranium activated phosphor compounds have been disclosed wherein the host components consist of lithium and magnesium oxides combined with oxides of selected tetravalent, hexavalent and pentavalent metal ions. These phosphors may be used for color correction in high pressure mercury lamps and other fluorescent discharge devices and as the green-emitting phosphor in color cathode ray tube screens.

As many changes could be made in the above described compositions and many different embodiments could be made without departing from the scope thereof, it is intended that all matter contained in the above description shall be interpreted as illustrative and not in a limiting sense.

What is claimed is:

1. A phosphor consisting essentially of compositions defined by the formular $$(Li_2O)_x(MgO)_y(AO_2)_z(BO_3)_z(C_2O_5)_{1-z}:wU$$

where A is a tetravalent metal ion selected from the group consisting of Ti, Zr, Hf, Ge, Sn and Pb, B is a hexavalent metal ion selected from the group consisting of Mo, Te, and W, C is a pentavalenet metal ion selected from the group consisting of Nb, Sb, and Ta, $x$ is between 2 and 6 and $x+y=8$, $z$ is greater than zero and does not exceed 1, and $w$ has a value selected to produce fluorescence when the composition is excited by ultraviolet, cathode-ray or X-ray radiation.

2. The phosphor defined by claim 1 wherein $w$ has a value between 0.005 and 0.10 gram-atom per gram-atom of the host.

3. The phosphor defined by claim 1 wherein A is Ge, B is W, C is Sb, $x=3$, $y=5$, $z=0.5$ and $w=0.02$.

4. The phosphor defined by claim 1 wherein A is Sn, B is Te, C is Sb, $x=3$, $y=5$, $z=0.5$ and $w=0.02$.

5. The phosphor defined by claim 1 wherein A is Hf, B is W, $x=3$, $y=5$, $z=1$, and $w=0.02$.

6. The phosphor defined by claim 1 wherein A is Zr, B is Te, $x=3$, $y=5$, $z=1$ and $w=0.02$.

7. A phosphor consisting essentially of compositions defined by the formula $(Li_2O)_x(MgO)_y(C_2O_5):wU$ where C is a pentavalent metal ion selected from the group consisting of Nb and Ta, $x$ is between 2 and 6 and $x+y=8$, and $w$ has a value between 0.005 and 0.10 gram-atom per gram-atom of the host $$(Li_2O)_x(MgO)_y(C_2O_5):wU$$

8. The phosphor defined by claim 7 wherein C is Nb, $x=3$, $y=5$, and $w=0.01$.

9. The phosphor defined by claim 7 wherein C is Ta, $x=4$, $y=4$, and $w=0.01$.

References Cited

UNITED STATES PATENTS

| | | | |
|---|---|---|---|
| 2,182,087 | 12/1939 | Leverenz | 252—301.1 |
| 2,225,704 | 12/1940 | McKeag | 252—301.5 |
| 2,558,913 | 7/1951 | Rice | 252—301.5 |
| 2,785,137 | 3/1957 | Ranby | 252—301.4 |
| 2,865,862 | 12/1958 | Mooney | 252—301.5 |
| 3,218,262 | 11/1965 | Lajarte | 252—301.1 |

BENJAMIN R. PADGETT, Primary Examiner

M. J. SCOLNICK, Assistant Examiner

U.S. Cl. X.R.

252—301.4, 301.5